United States Patent [19]

Slingerland

[11] Patent Number: 4,650,593

[45] Date of Patent: Mar. 17, 1987

[54] WATER-BASED DRILLING FLUIDS HAVING ENHANCED FLUID LOSS CONTROL

[75] Inventor: Robert E. Slingerland, Houston, Tex.

[73] Assignee: NL Industries, Inc., New York, N.Y.

[21] Appl. No.: 834,487

[22] Filed: Sep. 19, 1977

[51] Int. Cl.$^4$ .................................................. C09K 7/00
[52] U.S. Cl. ................................... 252/8.5; 525/54.5; 525/344; 525/333.5; 252/8.510
[58] Field of Search .......................... 252/8.5 C, 8.5 R; 525/54.5, 344, 333.5; 527/400; 524/72, 76; 175/65

[56] References Cited

U.S. PATENT DOCUMENTS 2,764,576  9/1956  Blaser et al. ...................... 525/333.5
4,425,460  1/1984  Makouashi et al. ............... 525/333.5

Primary Examiner—Josephine L. Barr
Attorney, Agent, or Firm—Browning, Bushman, Zamecki & Anderson

[57] ABSTRACT

A water based drilling fluid and process for using the same comprising a mixture of water and a polymer complex, wherein the polymer complex is the reaction product of a dispersant selected from the group consisting of lignite, sulfonated lignite, lignosulfonate, and sulfoalkylated lignite, and salts thereof and a water-soluble sulfonated polystyrene having a molecular weight of at least 70,000 and containing 0.7 to 2.0 sulfonic acid groups per styrene unit.

10 Claims, No Drawings

WATER-BASED DRILLING FLUIDS HAVING ENHANCED FLUID LOSS CONTROL

This invention relates to water base drilling fluids having an improved fluid loss control agent and drilling processes employing the same.

When wells are drilled with rotary drilling equipment, a drilling fluid is circulated down the drill pipe to the bit and back up the hole to the surface in an annular space between the drill pipe and the bore hole wall.

The drilling fluid performs many functions which are vital to the success of the drilling process. Generally, the best drilling fluids are aqueous suspensions of suspended solids, such as clay which readily forms colloidal dispersions that are heat stable, and low in viscosity. In addition, the drilling fluid must have a relatively high density in order to develop a high hydrostatic pressure for preventing the escape of gas, oil or water encountered during drilling.

Some of the additives employed in preparing drilling fluids include lignite, sulfonated lignite, starch, carboxymethyl cellulose, and low molecular weight sulfonated polystyrene. The resulting drilling fluids, however, have all been deficient for various reasons, particularly under conditions involving high electrolytic content and/or high borehole temperatures. For example, the use of lignite, primarily as a viscosity-controlling agent in aqueous drilling fluids, is sometimes limited because it precipitates in the presence of drilling contaminants such as sodium chloride and calcium materials, such as gypsum. Once the lignite is precipitated, the drilling fluid no longer exerts the desired protective colloidal action.

In contrast, starch and carboxymethyl cellulose are effective for preventing liquid transfer in the well bore, but each is deficient in another way. Starch is subject to bacterial attack in the mud, and carboxymethyl cellulose raises the viscosity of the drilling fluid if not employed properly to such an extent that pumping and circulation of the fluid becomes difficult, if not impossible. To compensate for such viscosity increases, it is common to add a dispersing or thinning agent, such as sodium acid pyrophosphate or other polyphosphate material. These polyphosphate materials, however, are generally unstable at the high temperatures encountered during drilling deep wells and they accordingly lose their effectiveness as colloidal stabilizers.

In some well drilling operations, high temperatures and pressures may cause flocculation or gellation of some of the mud components during drilling. Likewise, some components, such as the lignosulfonates and sulfonated lignite, begin to decompose at temperatures of about 300° F., resulting in loss of filtration control. In contrast, low molecular weight sulfonated polystyrene must be employed in excess amounts in drilling fluids to achieve adequate filtration control during use. These fluids, however, are difficult to circulate because of high viscosities.

A water base drilling fluid has been unexpectedly discovered having a fluid loss control agent which is effective at temperatures up to 500° F. comprising a polymer complex, wherein the polymer complex is the reaction product of a dispersant selected from the group consisting of lignite, sulfonated lignite, lignosulfonate, and sulfoalkylated lignite, and salts thereof, and a water-soluble sulfonated polystyrene having a molecular weight of at least 70,000 and containing 0.7 to 2.0 sulfonic acid groups per styrene unit.

The term "drilling fluid" as used herein refers to any liquid used as the circulating medium in a rotary drilling process. The drilling fluid may be clear water substantially free of suspended solids, which fluids are commonly used in drilling the hard formations in West Texas. Likewise, the drilling fluids can be prepared by dispersing inorganic solids such as native clays in water in concentrations as high as 20% or more by weight of the drilling fluid. The clays may be selected from a wide range of materials, such as montmorillonite, attapulgite, or kaolinite type clays. Synthetic minerals, such as synthetic zeolites, can also be used.

The term "water base" distinguishes the inventive drilling fluids from fluids employing oil-in-water emulsion drilling fluids and oil base drilling fluids. This term conventionally means drilling fluids which do not have intentionally added hydrocarbon oil to the drilling fluid. It should be recognized, however, that the novel compositions of this invention remain effective even if oil enters the drilling fluid, for example, through the formation being drilled.

Conventional rotary drilling techniques are employed in the process of using the novel drilling fluids of this invention. One technique involves pumping the drilling fluid down the hole through a drill pipe and discharging the fluid from the bit against the bottom of the hole. The drilling fluid picks up and carries the cuttings through an annular space surrounding the pipe to the surface where equipment separates the cuttings from the drilling fluid. If desired, reverse circulation of the drilling fluid can be employed. It is contemplated that other conventional circulation processes may also be employed.

The novel compositions of this invention contain as essential ingredients a polymer complex prepared from the reaction of a dispersant selected from the group consisting of lignite, sulfonated lignite, lignosulfonate, and sulfoalkylated lignite, and salts thereof, with a water-soluble sulfonated polystyrene.

The lignite employed in the invention is a variety of coal between peat and sub-bituminous coal. The distinction of lignite from these materials is not sharp as the transition from one to the other is gradual. For example, lignite has often been referred to as "brown coal" which is closely related to peat. The lignite derivatives and lignin derivatives employed in the invention are sulfonated lignite, lignosulfonates, and sulfoalkylated lignite all of which are obtained by sulfonation or sulfonation and complexing with certain transition metals. The processes for making these derivatives are well known in the art and do not constitute a part of this invention. One or more salts of the derivatives may also be used and may be selected from a wide variety of materials such as alkali metals (lithium, sodium, potassium, rubidium and cesium), alkaline earth metals (beryllium, magnesium, calcium, strontium, barium and radium), ammonium radicals and other cations such as aluminum, chromium, cobalt, copper, iron, magnesium, nickel and zinc. The alkylate portion of the sulfoalkylated lignite must render the compound water dispersible and it preferably contains from 1 to 10 carbon atoms. The most preferred sulfoalkylated lignite is sulfomethylated lignite. The most preferred dispersant comprises a combination of lignite, lignite derivatives or lignin derivatives and/or one or more salts thereof such as (a) sulfonated lignite and lignite, (b) lignosulfonate and sulfonated lignite and (c) lignosulfonate and lignite. Combinations of these materials are beneficial in view of their broadened temperature stabilities. For example, sulfonated lignite and lignite are more stable than lignosulfonate at higher temperatures, such as above about 450° F., but are not as effective as lignosulfonate at lower temperatures, such as around 350° F., for controlling fluid loss.

The substituted polystyrene used in the drilling fluids of this invention are polymers of styrene which have been sulfonated to the extent of from 0.7 to 2.0 sulfonic acid groups per styrene unit, preferably from 1.0 to 2.0, and most preferably 1.2 sulfonic acid groups per styrene unit. Among the materials which may be used are polymers of styrene, $\alpha$-alkyl styrene such as $\alpha$-methyl, $\alpha$-ethyl, $\alpha$-butyl, $\alpha$-stearyl styrenes, ring-substituted alkyl styrenes such as p-methyl styrene, p-butyl styrene, p-isopropyl styrene, p-octadecyl styrene, dimethyl styrene, and diethyl styrene, etc.

Sulfonation of the polymers of polystyrene may be carried out by conventional means, such as by reaction of the polystyrene with sulfuric acid, sulfur trioxide, and chlorosulfonic acids. These processes are well known in the art and do not constitute a part of this invention.

Salts of the sulfonated polystyrene may also be used to form the polymer complex which salts include the aforementioned alkali metals, alkaline earth metals, ammonia, and amines, as well as tertiary amines, and quaternary ammonium compounds. For ter base drilling fluids containing no salts, it is preferred to use the sodium salt of the polymer for economical reasons. For drilling fluid containing magnesium and calcium salts, it is preferred to use the tertiary amine or quaternary ammonium salts of the polymer due to the increased solubility of these salts in a brine drilling fluid.

The molecular weight of the polymer should be at least 70,000 and preferably at least 500,000. These high molecular weights represent the average molecular weight of the material. These molecular weights are essential to provide the necessary drilling fluid viscosity and high-temperature, high-pressure stability during drilling with the polymer complex. While it is recognized that lower molecular weight polymers have a higher water solubility, drilling fluid water loss, however, is improved with the higher molecular weight polymers. For a water base drilling fluid containing a smectite-type clay, such as bentonite clay, it is preferred to use a water-soluble sulfonated polystyrene having a molecular weight of from 5 million to 7 million in the polymer complex since these polymers have adequate water solubility and are particularly efficient in reducing water loss of the drilling fluid.

The inventive polymer complexes are prepared by reacting the dispersant with the water-soluble sulfonated polystyrene for sufficient time to obtain the desired complex. Usually the reaction is carried out in an aqueous medium. Preferably, the lignite, lignite derivative or lignin derivative is dispersed in water and the polymer added slowly with stirring for approximately 30 minutes to 10 hours. The reaction temperature is preferably between 180° and 300° F. Higher temperatures may be employed as long as the temperature is low enough to avoid thermal decomposition of the components of the complex.

The reaction time necessary to obtain an effective polymer complex will vary with the reaction temperature. At temperatures around 180° F., considerable time may be required to prepare an effective polymer complex. At higher reaction temperatures, the reaction time required is considerably shorter. For example, at 300° F., 30 minutes may be sufficient to prepare an acceptable material. The resulting polymer complex is water dispersible, that is, a portion of the complex is soluble in an aqueous medium whereas the remaining portion is partly dispersible. The wet polymer complex may be optionally dried by oven drying, spray drying, or other conventional drying procedure to evaporate water from the complex. The dry material preferably contains from 0 to 20% by weight moisture. Drying aids in handling and storage of the polymer complex prior to mixing in the drilling fluid.

The effectiveness of the polymer complex is increased by controlling the weight ratios of the dispersant to the sulfonated polystyrene. The ratio is determined by the extent of reaction and intended use since fluid loss control is dependent upon the entire drilling fluid composition. A weight ratio of dispersant to sulfonated polystyrene of 30:1 to 1:30 is sufficient to prepare an effective fluid loss additive, and it is preferably from 1 to 15:1. When the polymer has a molecular weight above 500,000, the weight ratio is preferably from 5 to 12:1 of dispersant to sulfonated polystyrene. In contrast, when the polymer has a molecular weight of 70,000 to 500,000, the weight ratio is preferably from 1 to 5:1 of dispersant to sulfonated polystyrene.

The amount of polymer complex used in a drilling fluid varies over wide limits within the solubility range thereof. This amount is dependent upon various factors, such as formation characteristics, and temperatures and pressures encountered during drilling. Preferably, between 0.5 and 20 lbs/42-gallon barrel of drilling fluid represents the most efficient amount of material for preventing water loss without drastically changing drilling fluid viscosity. Preferably, however, from 1 to 10 lbs/42-gallon barrel of drilling fluid is used effectively. Amounts less than 1% are generally only employed when viscosity is extremely critical or when only a small amount of water loss is anticipated.

The water base drilling fluids in which the polymer complex is employed may be based on fresh water, salt water, saturated salt water, sea water or other water normally used in preparing water base drilling fluids containing polyvalent cations. The polyvalent cations may be inherently present in the water, for example, in sea water which contains approximately 1,200 ppm magnesium ions and 400 ppm calcium ions or dissolved in the fluid, such as from the surrounding substrate formation. Flocculation of the polymer complex does not occur as a result of polyvalent cation contamination and accordingly addition of suitable prior art dispersants is not necessary.

The improved drilling fluids of this invention can be prepared and added to the drilling fluid either before drilling commences or while drilling is in progress. The method of addition is not critical. In either event, it is only necessary to obtain a stable dispersion of the polymer complex in the water base drilling fluid. This is easily accomplished by mixing the polymer complex with the drilling fluid in a fluid mud mixer or hopper along with other materials used to make up the drilling fluid. Circulation of the drilling fluid down the drill pipe and back to the mud pits will accomplish the desired dispersion of the complex.

A variety of drilling fluid additives may also be included in the drilling fluid provided these additives do not affect the basic and novel characteristics of the inventive compositions. Such commonly added additives include weighting materials such as barium sulfate, calcium carbonate, and iron oxide, as well as emulsifiers, fermentation control agents and the like.

Drilling fluids containing the polymer complex of the invention are particularly valuable in that they promote filtration control in fresh water-base drilling fluids and water-base drilling fluids containing salts of magnesium, calcium, sodium and potassium at temperatures up to about 500° F. Filtration control is believed to be achieved by the formation of a filter cake on the walls of the borehole which filter cake is substantially impermeable to water and the natural occurring fluids in the formation. The ability to achieve fluid loss control during drilling deep wells in the presence of high temperatures and high pressures and/or electrolytes has heretofore not been achieved to the level obtained by use of the inventive compositions.

The following examples are given to illustrate the invention but are not deemed to be limiting thereof. All percentages given are based upon weight unless otherwise indicated. All measurements were performed in accordance with the *American Petroleum Institutes Standard Procedure for Testing Drilling Fluids* identified as API RP13B, 6th Ed., April, 1976.

EXAMPLE 1

Comparative Runs A and B

Inventive Runs 1 to 6

A water base drilling fluid was prepared by mixing 40 grams of Western Bentonite clay, 60 grams Glen Rose shale, and 1.5 grams caustic soda to 350 ml of synthetic sea water. The mixture was stirred for two hours and then rolled at 150° (65.6° C.) for 16 hours. Following rolling, the drilling fluid was cooled to 75° F. (24° C.) and the pH value of the fluid was adjusted to 10.0 with caustic soda. Separate 350 ml portions of the mixture were then used for testing. The desired amount of polymer complex was added to the 350 ml drilling fluid and stirred for 15 minutes on a MULTI-MIXER ™. Initial rheology and API fluid loss measurements were then made. The sample was rolled for an additional 16 hours at 150° F. (65.6° C.), cooled to 75° F. (24° C.), stirred on a MULTI-MIXER ™ for five minutes and rheology and the API fluid measurements taken again. The sample was then aged at 450° F. (232° C.) for 16 hours, cooled to 75° F. (24° C.), stirred for 15 minutes on a MULTI-MIXER ™ and final rheology and API fluid measurements made. The results are set forth in Table I.

In Comparative Runs A and B, no polymer complex was employed.

Inventive Runs 1 and 4 used a polymer complex of sulfonated lignite and sodium poly(styrene sulfonate). The polystyrene had a molecular weight ranging from 5 to 7 million. The complex was prepared by slowly adding 44.4 grams sulfonated lignite to 700 ml tap water with stirring. When all of the sulfonated lignite was added, 5.6 grams of the sulfonated polystyrene was added slowly without stirring. The mixture was then heated to 180° F. (82° C.) and stirred for six hours. Following the reaction, the water was evaporated from the polymer complex by air drying and the dried material ground to pass through a 60 mesh screen (U.S. Standard Size).

Inventive Runs 2 and 5 used a polymer complex containing caustisized lignite instead of sulfonated lignite which complex was prepared according to the procedure described for Runs 1 and 4. The caustisized lignite contained six parts lignite to one part caustic soda.

Inventive Runs 3 and 6 used a polymer complex containing 37.0 grams caustisized lignite and 7.4 grams ferrochrome lignosulfonate instead of sulfonated lignite, which complex was prepared according to the procedure described for Runs 1 and 4.

EXAMPLE 2

Comparative Runs C, D, E and F

Inventive Run 7

The procedure of Example 1 was repeated with a polymer complex of sulfonated lignite and sodium poly(styrene sulfonate) having a molecular weight ranging from 5 to 7 million. The dispersant to polymer weight ratio was 11:1.

Comparative Run C employed a dry mixture of the same dispersant and polymer employed in Run 7 in the same weight ratio.

Comparative Run D employed the Run 7 dispersant alone.

Comparative Run E employed the Run 7 polymer alone.

Comparative Run F employed the drilling fluid in the absence of any of the foregoing additives.

The API filtrate results after rolling at 150° F. (65.6° C.) are set forth in Table II.

EXAMPLE 3

Comparative Runs G, H, I and J

Inventive Run 8

The procedure of Example 2 was repeated with sulfomethylated lignite instead of sulfonated lignite with a dispersant to polymer weight ratio of 10:1.

The API filtrate results after rolling at 150° F. (65.6° C.) are set forth in Table III.

EXAMPLE 4

Comparative Run K

Inventive Runs 9 to 13

The procedure of Example 1 was repeated with different ratios of sulfonated lignite to sodium poly(styrene sulfonate) complexes. The complexes were evaluated at 8 lb/42-gallon barrel in the drilling fluid of Example 1. The results are set forth in Table IV.

EXAMPLE 5

Comparative Runs L, M, N and O

Inventive Run 14

Separate portions of a water base drilling fluid were prepared by adding and mixing 40 grams Western Bentonite clay, 30 grams Glen Rose shale, 6 grams ferrochrome lignosulfonate and 1.5 grams caustic soda (NaOH) to 350 ml of synthetic sea water. The mixture was stirred for 15 minutes at 75° F. (24° C.). The desired amount of polymer complex prepared according to Example 1 from sulfomethylated lignite and sulfonated polystyrene having a molecular weight range of 5 to 7 million or additive was then added to the drilling fluid and stirred for 15 minutes. The samples were then rolled for 16 hours at 150° F. (65.6° C.), cooled to 75° F. (24° C.), and stirred on a MULTI-MIXER ™. API fluid measurements and "HPHT" filtrated concentrations after heating to 300° F. (149° C.) were then taken. The results are set forth in Table V.

The invention being thus described, it will be obvious that the same may be varied in many ways. Such variations are not to be regarded as a departure from the spirit and scope of the invention, and all such modifications are intended to be included within the scope of the following claims.

TABLE I

| Run | A | 1 | 2 | 3 | B | 4 | 5 | 6 |
|---|---|---|---|---|---|---|---|---|
| Additive Amount, lb/42-gal barrel | 0 | 6 | 6 | 6 | 0 | 8 | 8 | 8 |
| Initial | | | | | | | | |
| plastic viscosity, cp | 6 | 7 | 7 | 6 | 7 | 10 | 8 | 9 |
| yield point, lb/100 ft$^2$ | 18 | 6 | 3 | 8 | 23 | 4 | 9 | 10 |
| 10 sec gel, lb/100 ft$^2$ | 10 | 3 | 3 | 4 | 10 | 3 | 3 | 7 |
| 10 min gel, lb/100 ft$^2$ | 10 | 12 | 8 | 11 | 13 | 17 | 15 | 23 |
| pH | 10.1 | 10.2 | 9.8 | 9.7 | 9.7 | 9.8 | 9.9 | 9.9 |
| API filtrate, cc | 58 | 19 | 26 | 24 | 54.2 | 11.8 | 22.8 | 20.8 |
| Rolled 65.6° C. | | | | | | | | |
| plastic viscosity, cp | 6 | 6 | 6 | 6 | 6 | 11 | 8 | 8 |
| yield point, lb/100 ft$^2$ | 15 | 7 | 5 | 3 | 17 | 4 | 8 | 8 |
| 10 sec gel, lb/100 ft$^2$ | 11 | 3 | 3 | 2 | 11 | 3 | 4 | 5 |
| 10 min gel, lb/100 ft$^2$ | 11 | 4 | 6 | 6 | 11 | 6 | 10 | 12 |
| pH | 8.9 | 9.2 | 8.7 | 8.6 | 8.8 | 9.1 | 8.6 | 8.5 |
| API filtrate, cc | 56 | 17 | 27 | 25 | 50.0 | 10.5 | 23.5 | 18.1 |
| Aged 232° C. | | | | | | | | |
| gel strength, lb/100 ft$^2$ | 34 | 39 | 39 | 31 | 21 | 21 | 54 | 33 |
| settling | 0 | 0 | 0 | 0 | 0 | 0 | 0 | 0 |
| plastic viscosity, cp | 6 | 6 | 5 | 4 | 5 | 9 | 11 | 11 |
| yield point, lb/100 ft$^2$ | 63 | 60 | 63 | 57 | 55 | 56 | 69 | 44 |
| 10 sec gel, lb/100 ft$^2$ | 26 | 18 | 16 | 13 | 32 | 40 | 46 | 49 |
| 10 min gel, lb/100 ft$^2$ | 18 | 18 | 36 | 12 | 27 | 50 | 42 | 42 |
| pH | 7.6 | 8.6 | 8.3 | 8.2 | 7.7 | 8.7 | 9.0 | 8.9 |
| API filtrate, cc | 74 | 54 | 61 | 59 | 58.5 | 29.0 | 42.0 | 40.5 |

TABLE II

| Run | Sample | Amount Of Additive, ppb | API Filtrate, cc |
|---|---|---|---|
| 7 | Polymer complex | 8 | 8.8 |
| C | Dry blend | 8 | 9.8 |
| D | Sulfonated lignite | 8 | 12.8 |
| E | Sulfonated polystyrene | 0.7 | 48.0 |
| F | Base fluid | 0 | 52.4 |

TABLE III

| Run | Sample | Amount Of Additive, ppb | API Filtrate, cc |
|---|---|---|---|
| 8 | Polymer complex | 10 | 3.6 |
| G | Dry blend | 10 | 4.2 |
| H | Sulfomethylated lignite | 9.1 | 6.4 |
| I | Sulfonated polystyrene | 0.9 | 18.6 |
| J | Base fluid | 0 | 44 |

TABLE IV

| | Run | | | | | |
|---|---|---|---|---|---|---|
| | K | 9 | 10 | 11 | 12 | 13 |
| Dispersant: polymer wt. ratio | 0 | 12:1 | 10:1 | 8:1 | 5:1 | 2:1 |
| Initial | | | | | | |
| plastic viscosity, cp | 7 | 9 | 9 | 9 | 10 | 13 |
| yield point, lb/100 ft$^2$ | 5 | 5 | 5 | 4 | 5 | 7 |
| 10 sec gel, lb/100 ft$^2$ | 10 | 3 | 3 | 1 | 4 | 3 |
| 10 min gel, lb/100 ft$^2$ | 11 | 13 | 12 | 12 | 13 | 14 |
| pH | 9.8 | 9.6 | 9.6 | 9.6 | 9.6 | 9.4 |
| API filtrate, cc | 56.7 | 16.0 | 17.3 | 14.0 | 13.2 | 5.6 |
| Rolled 65.6° C. | 16 | 16 | 16 | 16 | 16 | 16 |
| plastic viscosity, cp | 6 | 8 | 8 | 8 | 8 | 11 |
| yield point, lb/100 ft$^2$ | 12 | 2 | 0 | 2 | 4 | 6 |
| 10 sec gel, lb/100 ft$^2$ | 8 | 2 | 2 | 1 | 2 | 1 |
| 10 min gel, lb/100 ft$^2$ | 13 | 5 | 6 | 6 | 5 | 8 |
| pH | 8.6 | 8.9 | 8.7 | 8.7 | 8.7 | 8.6 |
| API filtrate, cc | 51.0 | 13.6 | 14.7 | 11.7 | 14.6 | 5.0 |
| Aged 232° C. | 16 | 16 | 16 | 16 | 16 | 16 |
| gel strength, lb/100 ft$^2$ | 25 | 24 | 29 | 25 | 34 | 31 |
| settling | 0 | 0 | 0 | 0 | 0 | 0 |
| plastic viscosity, cp | 6 | 7 | 7 | 7 | 7 | 10 |
| yield point, lb/100 ft$^2$ | 36 | 46 | 46 | 49 | 55 | 33 |
| 10 sec gel, lb/100 ft$^2$ | 28 | 36 | 43 | 46 | 53 | 36 |
| 10 min gel, lb/100 ft$^2$ | 30 | 44 | 43 | 50 | 56 | 36 |
| pH | 7.6 | 8.5 | 7.9 | 8.3 | 8.6 | 8.1 |
| API filtrate, cc | 69.4 | 39.5 | 38.6 | 38.2 | 34.8 | 33.4 |

TABLE V

| Run | Sample | Amount of Additive (lb/42-gal barrel) | API Filtrate, cc | "HPHT" @ 300° F. Filtrate, cc |
|---|---|---|---|---|
| 14 | Polymer complex 10:1 ratio | 10 | 3.6 | 64 |
| L | Dry blend 10:1 ratio | 10 | 4.2 | 70 |
| M | Sulfomethylated lignite | 9.1 | 9.0 | 124 |
| N | Sulfonated polystyrene | 0.9 | 18.6 | 88 |
| O | Base fluid | 0 | 44.0 | 150 |

What is claimed is:

1. A water base drilling fluid comprising a mixture of water and a polymer complex, wherein the polymer complex is the reaction product of a dispersant selected from the group consisting of lignite, sulfonated lignite, lignosulfonate, and sulfoalkylated lignite, and salts thereof, and a water-soluble sulfonated polystyrene having a molecular weight of at least 70,000 and containing 0.7 to 2.0 sulfonic acid groups per styrene unit, wherein the polymer complex has a weight ratio of dispersant to sulfonated polystyrene of from 30:1 to 1:30.

2. The drilling fluid of claim 1 wherein the sulfoalkylated lignite is sulfomethylated lignite.

3. The drilling fluid of claim 1 wherein the weight ratio of dispersant to sulfonated polystyrene is from 1 to 15:1.

4. The drilling fluid of claim 1 wherein the weight ratio of dispersant to sulfonated polystyrene is from 5 to 12:1 and the sulfonated polystyrene has the molecular weight above 500,000.

5. The drilling fluid of claim 1 wherein the weight ratio of dispersant to sulfonated polystyrene is from 1 to 5:1 and the sulfonated polystyrene has the molecular weight of 70,000 to 500,000.

6. The drilling fluid of claim 1 wherein the sulfonated polystyrene has a molecular weight of at least 500,000 and from 1.0 to 2.0 sulfonic acid groups per styrene unit.

7. The drilling fluid of claim 1 wherein the sulfonated polystyrene has a molecular weight from 5 to 7 million and 1.2 sulfonic acid groups per styrene unit.

8. A process of drilling a well with a rotary bit which comprises forming a borehole with said bit while circulating through said bit and through said hole in contact with the walls thereof, a water base drilling fluid having enhanced fluid loss control comprising a mixture of:
 (a) sufficient water to maintain said mixture fluid; and
 (b) a small but effective amount of a polymer complex, wherein the polymer complex is the reaction product of a dispersant selected from the group consisting of lignite, sulfonated lignite, lignosulfonate, sulfoalkylated lignite and salts thereof, and a water-soluble sulfonated polystyrene having a molecular weight of at least 70,000 and containing 0.7 to 2.0 sulfonic acid groups per styrene unit, wherein the polymer complex has a weight ratio of dispersant to sulfonated polystyrene of from 30:1 to 1:30.

9. The process of claim 8 wherein the sulfoalkylated lignite is sulfomethylated lignite.

10. The process of claim 8 wherein the weight ratio of dispersant to sulfonated polystyrene is from 1 to 15:1.

* * * * *